United States Patent [19]

Haggstrom et al.

[11] 3,869,007
[45] Mar. 4, 1975

[54] WEIGHING TABLE PARTICULARLY FOR A ROLLER CONVEYOR

[75] Inventors: Rolf Paul Haggstrom; Bengt-Ake Karlsson, both of Karlskoga, Sweden

[73] Assignee: AB Bojors, Bojors, Sweden

[22] Filed: Oct. 25, 1973

[21] Appl. No.: 409,573

[30] Foreign Application Priority Data
Nov. 13, 1972 Sweden............................ 14673/72

[52] U.S. Cl.............. 177/211, 177/255, 177/DIG. 9
[51] Int. Cl......................... G01g 3/14, G01g 21/24
[58] Field of Search ....... 177/210, 211, 255, DIG. 9

[56] References Cited
UNITED STATES PATENTS

| | | | |
|---|---|---|---|
| 2,802,660 | 8/1957 | Williams, Jr. | 177/255 |
| 3,512,595 | 5/1970 | Laimins | 177/255 X |
| 3,658,143 | 4/1972 | Schwartz | 177/DIG. 9 |
| 3,741,328 | 6/1973 | Andersson et al. | 177/210 |

Primary Examiner—George H. Miller, Jr.
Attorney, Agent, or Firm—Pollock, Philpitt & Vande Sande

[57] ABSTRACT

A weighing table for use in a roller conveyor comprising an inner unit for carrying the load suspended by horizontal flexure plates on a pluralilty of upstanding members, said inner unit resting on a single force transducer to indicate the load.

8 Claims, 7 Drawing Figures

WEIGHING TABLE PARTICULARLY FOR A ROLLER CONVEYOR

BACKGROUND OF THE INVENTION

The present invention relates to a weighing table, which is intended for use particularly in a roller conveyor. The weighing table comprises a horizontal frame with side parts protruding upwardly from said frame and forming an outer unit which serves as a fixed part, and an inner unit which is operatively connected to the outer unit and serves as a movable part, having a substantially horizontally arranged part at its upper sections for receiving a load.

The purpose of the invention is to provide its weighing table which, notwithstanding a particularly high measuring precision is of a simple construction and economical to manufacture. The weighing table is intended for use in various ways, and is moreover made in the form of a separate construction element which, for its installation, is independent of mounting in a foundation and the like, and which can easily be linked into, for example, a roller conveyor in which event, the part of receiving the load is then provided with rails and rollers which at least substantially correspond to those of the roller conveyor. Since the weighing table forms a separate unit, its measuring accuracy is view points, impaired during installation which substantially reduces the installation cost.

In the prior weighing apparatus used in roller conveyors, four force transducers have been used to support the inner unit at four corners. This involves drawbacks both from the technical and economic view points since it is desirable that it should be possible to apply the load arbitrarily on the load-receiving part so that the load measurment will be independent of where the load is applied. Because of this, it has therefore been necessary to dimension each transducer for the maximum load expected to be applied to the weighing table. Also, the use of four transducers results in unfavourable signal conditions, and individual equalization of the transducers for one and the same weighing table must then be carried out.

SUMMARY OF THE INVENTION

The present invention provides a weighing table which, inter alia, solves the above-mentioned problems for weighing devices for roller conveyors. A principal feature of the invention is that the inner unit rests upon force transducer fastened to the frame, and the arrangement is such that the weighing table is able to mechanically withstand heavy transversal forces and to transmit an output signal which is independent of such transversal forces. This is made possible by the fact that the inner unit at said upper sections is fastened to the side parts via at least one membrane which is arranged with a pronounced spring action in the measuring direction but with pronounced rigidity in a direction at right angles to the measuring direction.

BRIEF DESCRIPTION OF THE DRAWINGS

An embodiment of a weighing table in accordance with the invention will be described in the following, with reference to the attached drawings, in which.

In the figures, parts corresponding to each other have been given the same reference designations.

Figure 1:
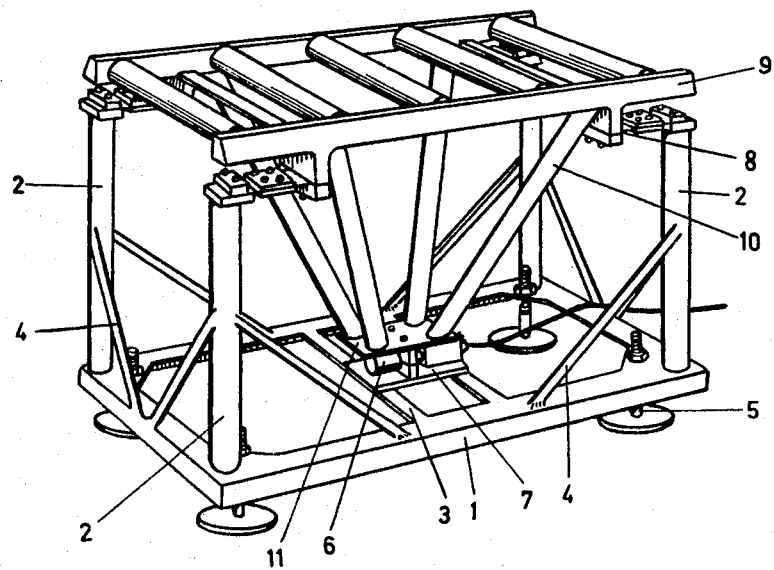
FIG. 1 shows in perspective a weighing table applied to a roller conveyor.

FIG. 1 shows an outer unit formed by a horizontal frame 1 with side parts protruding upwardly therefrom to provide four corner posts 2. The outer unit also is provided with two transversal frame parts 3 and elements 4 for bracing the corner posts. The outer unit forms the fixed part of the weighing table, and need not be fastened to a foundation or the like, but is applied directly on a floor surface or corresponding surface via adjustable feet 5 which respectively comprise a threaded bolt with locking nuts and a foot plate which has a central hole in which the bolt is inserted. The foot plate can be made to adapt itself to the floor surface, after which it can, for example, be welded to the bolt. A force transducer 6 is fastened on a plate 7 mounted on the transversal frame parts 3 at the central section of the frame 1, the transducer being oriented in such a way that its longitudinal direction coincides with the longtudinal direction of the table.

An inner unit is operatively connected to the outer unit and rests on the force transducer 6. The inner unit is connected at its upper sections to each of the corner posts 2 via a respective membrane 8, the four membranes thus provided being located in one and the same horizontal plane. The membranes at the respective short sides of the weighing table are turned inwardly to prevent parts from protruding from the table, which facilitates the positioning of the table in the location chosen. The inner unit comprises a part 9 for receiving a load which is in the form of a roller conveyor part and includes four legs 10 sloping inwardly from the upper sections of the part. It also includes a lower plate 11, in which, on the upper side, said legs are fastened. On the under side of the lower plate is fastened an edge, not shown in detail in FIG. 1, which is in contact with the transducer.

Figure 2:
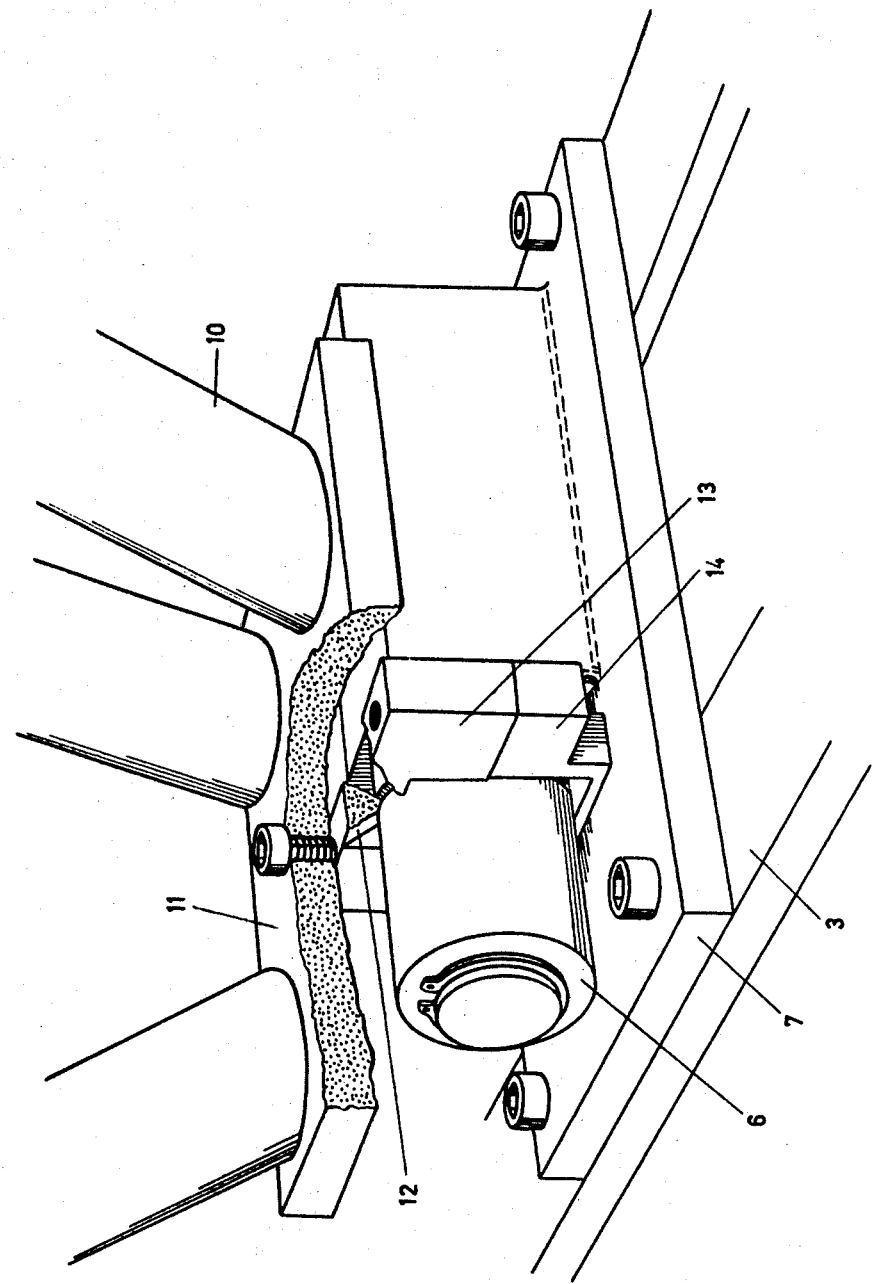
FIG. 2 shows in a vertical view the fastening of a force transducer.

FIG. 2 shows the positioning of the transducer in detail from one of its ends. The inner unit rests upon a transducer via the edge 12, which coacts with a groove in the transducer. The edge is supported by a member 13 fastened to the under side of the plate 11 which, apart from the edge has parts enclosing the transducer with a small amount of play, so that the inner unit can execute the necessary movements in and at right angles to the Figure plane according to FIG. 2.

A bracket 14 is mounted on the member 13, which bracket 14 extends around the under side of the transducer. Assurance is thereby obtained, in an extremely simple way that the membrane 8 will not brake down when the inner unit is subjected to lifting movements.

Figure 3:
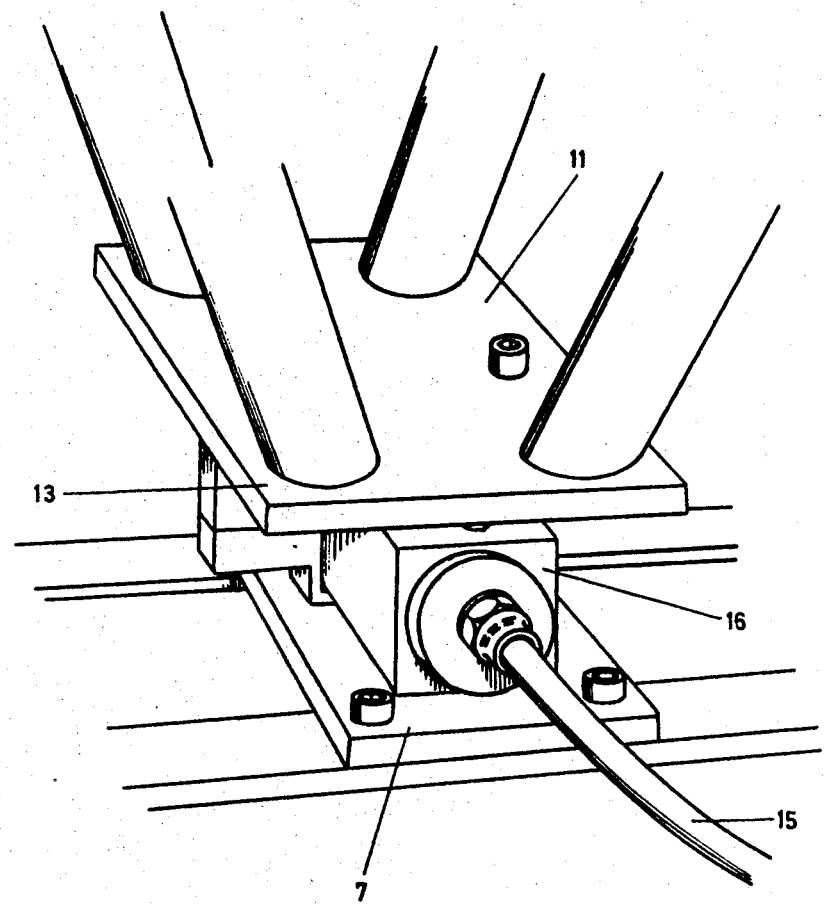
FIG. 3 shows in a vertical view the fastening of the force transducer according to FIG. 2 viewed from another direction.

FIG. 3 shows the positioning of the transducer from its other end, the lead to the transducer being designated 15. The transducer is fastened to the outer unit via an element 16 enclosing the transducer and the element in turn is firmly attached to the plate 7.

Figure 4:
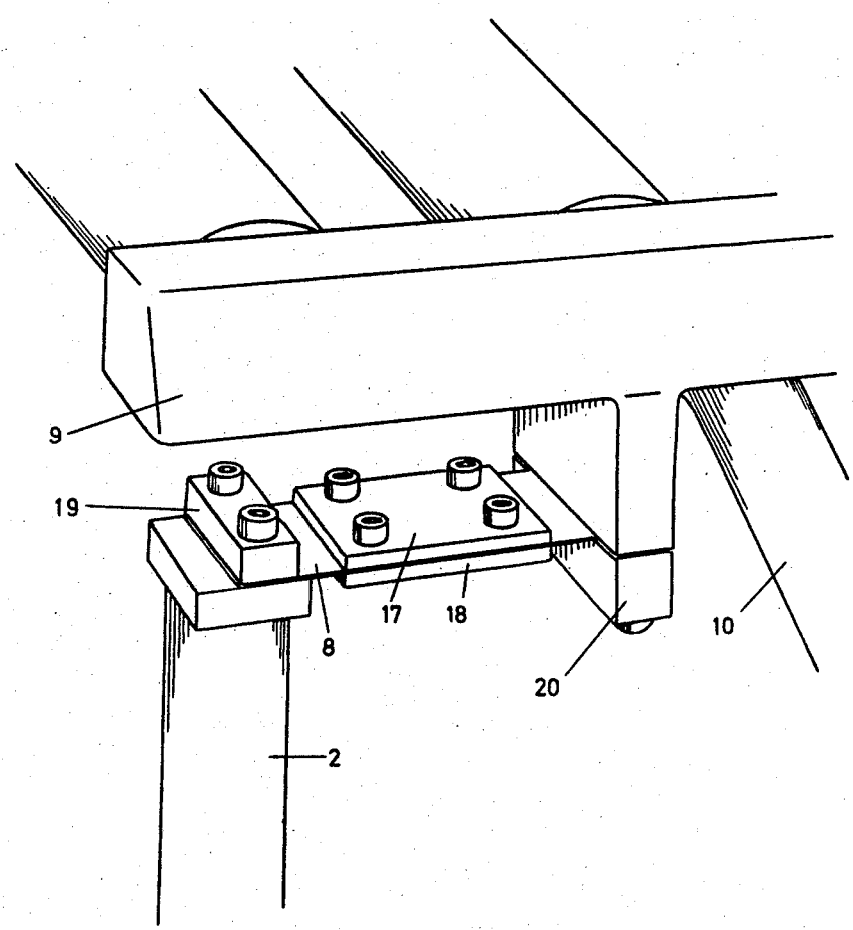
FIG. 4 in a vertical view shows the design of a membrane.

FIG. 4 shows the embodiment of and the fastening of the membrane 8 which, in principle, consists of a comparatively thin rectangular plate extending in a plane parallel with the horizontal plane of the part 9 for receiving the load. At its center sections, the membrane is enclosed by two plates 17 and 18 which are screwed together with the membrane inbetween. At its respective ends, the membrane is fastened to a respective corner post 2 and is fastened to the inner unit by means of blocks 19 and 20 respectively, which are fastened to the post 2 and the part 9, respectively, with the membrane inbetween. The choice of material and design of the membrane are important for the function of the weighing table, as the membrane is desired to be very weak in the measuring direction but yet be resistant to tensile and torsional stresses. A suitable material for the membrane is beryllium copper or the like.

Figure 5:
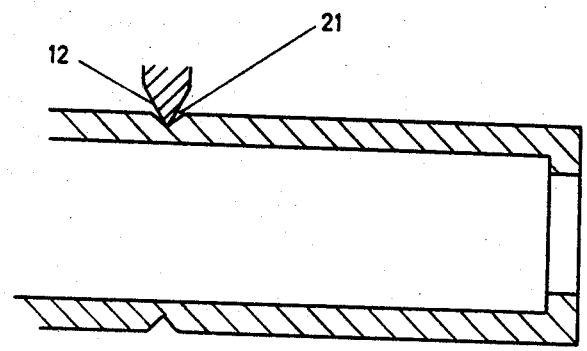
FIG. 5 is a vertical cross-sectional view of a part of the weighing table according to FIG. 1.

FIG. 5 shows how the edge 12 coacts with a groove 21 in the transducer.

Figure 6:
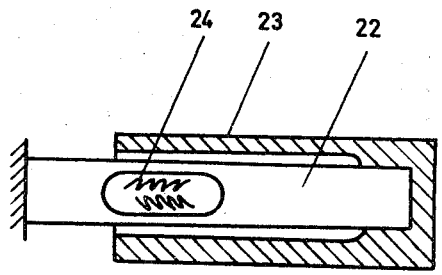
FIG. 6 shows in a vertical view and partly out away a first embodiment of the force transducer.
Figure 7:
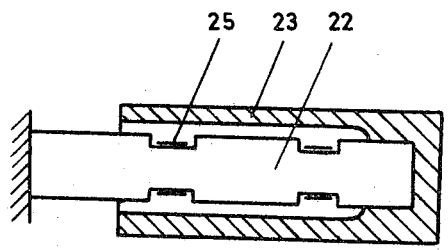
FIG. 7 is a vertical cross-sectional view of a second embodiment of the force transducer.

FIGS. 6 and 7 show force transducers which are appropriate for use in the weighing table according to the invention. The transducer in question contains a first beam 22, one end of which can be freely bent and is rigidly connected with a second beam 23, which extends freely to the side of the first beam and is shorter than this. The transducer is provided with strain gauges 24 (FIG. 6) and 25 (FIG. 7) which sense deformations in the material in the first beam caused by shearing stresses (FIG. 6) and bending stresses (FIG. 7). At the place where the strain gauges 24 are placed, the transducer according to FIG. 6 is made with an I-beam form. As a result the strain gauge has a position at the neutral axis of the first beam where the deformations caused by the shearing stresses will be particularly prominent, thereby increasing the sensitivity of the transducer without weakening the transducer thereby to any significant extent. The corresponding measures have been taken on the transducer according to the embodiment shown in FIG. 7, so that the strain gauges can be applied at places where the deformations owing to the bending stresses will be pronounced. The transducer according to FIG. 7 is particularly suitable for use when the weighing table is to be made for the lower measuring ranges.

The transducers shown together with their strain gauges are known per se and will therefore not be discussed here in detail. It is characteristic of transducers of this kind that they can mechanically withstand great transversal forces which arise on the weighing table when the load is applied out at the edges of the part 9, and that they provide an output signal which is independent of said forces. In this connection, it may be mentioned that they can be dimensioned, without inconvenience, to withstand great transversal forces of as much as 100 percent of the nominal measuring force. If FIGS. 2 and 3 are considered again, it will be noted that the first beam is fastened in the element 16 or the outer unit, while the inner unit is in contact with the second beam via said edge 12.

The invention is not limited to the embodiment shown as an example, but can be subject to modifications within the scope of the following claims. Thus, for instance, the part for receiving the load can be made in the form of a flat handling plate, and in certain applications it can also be appropriate to replace the membrane in question with a drawbar for each main direction at right angles to the measuring direction. Moreover, overload which prevents too great a depression of the membranes or bars in question can be introduced at the corner post. The edge can also be replaced by some other contact member.

We claim:

1. A weighing table especially adapted for use in a roller conveyor comprising in combination:
   a supporting frame including a plurality of upstanding members,
   an inner unit for carrying the load to be weighed,
   a single force transducer having a first part thereof connected to said supporting frame,
   said inner unit including a plurality of connecting members extending from said inner unit to a further element which is in turn connected to a second part of said force transducer,
   a plurality of support means each connecting said inner unit to a respective one of said upstanding members adjacent its upper end, each of said support means comprising a thin, flat, flexible member but with high tensile strength, each of said members lying in the same horizontal plain,
   whereby said force transducer is subject to vertical loads but transverse force components on said inner unit are resisted by said plurality of support means.

2. The apparatus of claim 1 wherein each said connecting member extends downwardly and inwardly toward said further element.

3. The apparatus of claim 1 wherein said thin, flat, flexible member of each said support means is formed of beryllium copper.

4. The apparatus of claim 1 wherein said further element comprises a flat plate which on its lower surface supports a V-shaped edge which engages an annular groove formed in said transducer.

5. The apparatus of claim 4 which further includes means for restraining upward movement of said inner unit.

6. The apparatus of claim 1 wherein said transducer is of the type wherein said first part comprises a beam supported in cantilever fashion to a second shorter beam comprising said second transducer part, said further element including a V-shaped edge supported in an annular groove in said second beam.

7. The apparatus of claim 6 wherein said beam comprising said first part supports a strain gauge for sensing deformation in the beam material.

8. The apparatus of claim 6 wherein said beams included in said transducer are oriented with their axes lying along the direction of movement along said inner unit of an article to be weighed.

* * * * *